United States Patent [19]
Kroeger

[11] 3,822,937
[45] July 9, 1974

[54] SLIDE PROJECTOR WITH MEANS TO ELIMINATE JAMS

[75] Inventor: Everett C. Kroeger, Mattoon, Ill.

[73] Assignee: VueTech Corporation, Maryland Heights, Mo.

[22] Filed: July 24, 1972

[21] Appl. No.: 274,230

[52] U.S. Cl. ............................. 353/114, 353/117
[51] Int. Cl. ...................... G03b 23/02, G03b 23/06
[58] Field of Search ............ 353/116, 117, 120, 114

[56] References Cited
UNITED STATES PATENTS

| | | | |
|---|---|---|---|
| 2,978,823 | 4/1961 | Wikland | 353/116 |
| 3,209,647 | 10/1965 | Hall | 353/117 |
| 3,402,489 | 9/1968 | Schlessel | 40/79 |
| 3,572,921 | 3/1971 | Mulch | 353/117 |
| 3,576,366 | 4/1971 | Shaeffer | 353/117 |
| 3,697,161 | 10/1972 | Blecher | 353/117 |

Primary Examiner—Samuel B. Rothberg
Assistant Examiner—A. Jason Mirabito
Attorney, Agent, or Firm—Gravely, Lieder & Woodruff

[57] ABSTRACT

A projector capable of holding a circular slide tray and having a pinion gear which engages a rack at the periphery of the tray for indexing the tray is provided with a retaining arm which is engageable with the back face of the slide tray to prevent the rack at the periphery of the tray from backing away from the pinion gear. This insures that the rack remains fully engaged with the pinion gear and that the tray indexes completely, so that the changer arm of the projector will not jam as it moves into and out of the tray. The pinion gear rotates about a spindle, and this spindle serves as a mount for a guide shoe which receives the changer arm and confines it in the direction transverse to the direction of movement for the changer arm. Thus, the changer arm has little free motion in that transverse direction and will precisely align with the slides in the tray.

10 Claims, 5 Drawing Figures

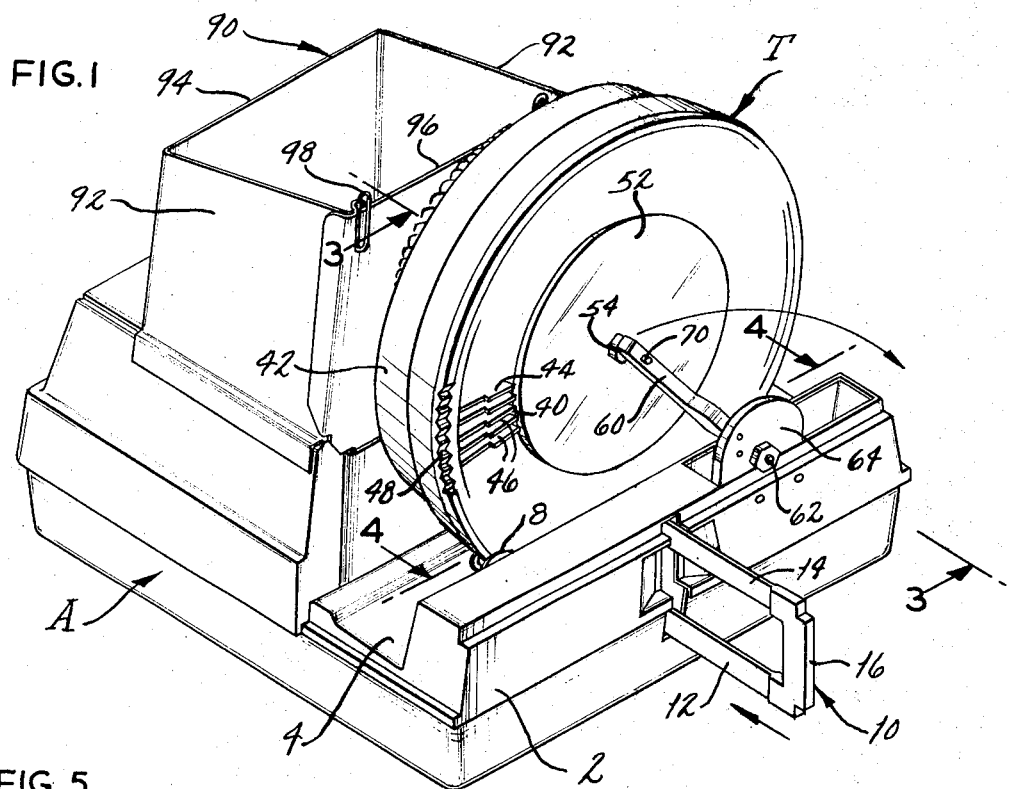
FIG. 1
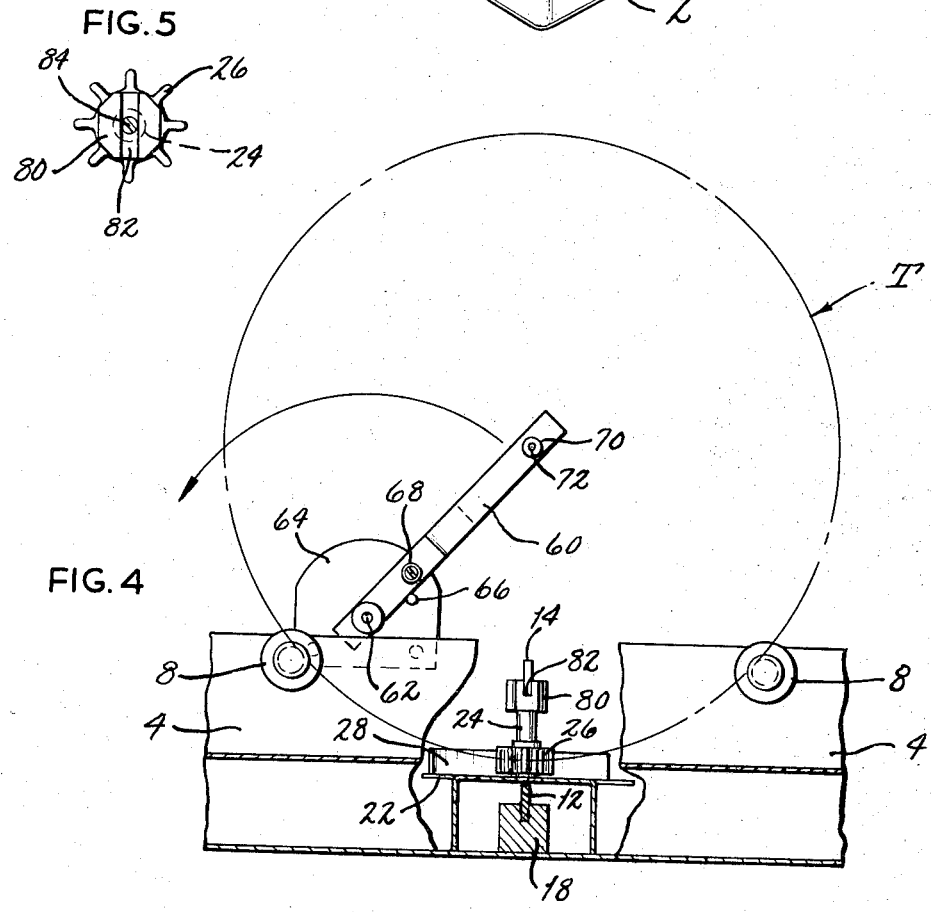
FIG. 5
FIG. 4

SLIDE PROJECTOR WITH MEANS TO ELIMINATE JAMS

BACKGROUND OF THE INVENTION

This invention relates in general to slide projectors, and in particular, to slide projectors which are virtually jam proof.

Projectors capable of automatically projecting a series of slides in sequence serve not only as a means of home entertainment, but have commercial applications also. Insofar as home use is concerned, the projectors are used only occasionally, and when they are used, they are usually under constant surveillance. Should the slide changing mechanism of such a projector jam, someone is usually available to relieve the jam or at least shut off the projector. Hence, slide projectors used for home entertainment are rarely damaged when their slide changing mechanisms jam, nor are the slide presentations delayed much.

In commercial applications the situation is quite different, for the projectors are often left unattended for long periods of time and in many instances they are positioned in remote locations to which access is not easily available. As a result jammed changing mechanisms often go unnoticed and unattended for relatively long intervals during which extensive damages to the projector may occur. It is therefore important to have the slide changing mechanism as jam proof as possible.

One of the primary commercial applications for slide projectors is that of displaying advertising messages, usually in places frequented by many people, such as airports, supermarkets, department stores, theatre lobbies, and hotel lobbies. Normally, the projector is contained within a housing, along with a mirror and ground glass screen, and projects the slide image onto the mirror from which the image is reflected onto the backside of the ground glass screen. The front face of the screen is, of course, exposed so that the image projected on its back side is clearly visible to those individuals in sight of the screen. The housing is usually mounted high on a wall and is therefore not easily accessible.

Many of the projectors used for commercial applications use a circular or rotary tray which rotates about a horizontal axis. Since the tray is circular it is without beginning or end, and the slide presentation will repeat itself over and over again. The tray has slots which align with a slide channel leading to the optical axis of the projector. Each time a slot aligns with the projector slide channel a changer arm on the projector enters the slot and pushes the slide therein into the projector slide channel where it is projected. In addition, the back side of the tray has a rack which is engaged by a pinion gear forming part of the projector indexing mechanism, and as the gear rotates so does the tray, thus enabling the tray to be indexed one slot or one slide at a time.

In projectors of current manufacture the tray fits rather loosely in the projector, and as a result the tray tends to back away from the gear which indexes it. This is particularly true where the projector is mounted on a slight angle as is often the case when it is used to display advertising messages in elevated positions. The end result is that the tray on occasion does not index fully, and the changer arm, instead of entering a slot after the indexing movement, engages the web separating two adjacent slots. This causes the changer arm to jam, and unless the jam is relieved after a short period of time, the motor which operates the changer arm will be damaged. The jam also interrupts the slide presentation.

In addition, the changer arm itself is mounted quite loosely in the projector housing, and this compounds the tendency to jam.

SUMMARY OF THE INVENTION

One of the principal objects of the present invention is to provide an automatic projector with accessories which make it virtually jam proof in operation. Another object is to provide a projector which operates automatically for extended periods of time without the need for constant surveillance. A further object is to provide a projector of the type stated with means for preventing the slide tray from backing away from the gear which indexes it so that the rack on the tray remains positively engaged with the indexing gear. An additional object is to provide a projector in which the changer arm will precisely align with the slides. These and other objects and advantages will become apparent hereinafter.

The present invention is embodied in restraining means for preventing a circular slide tray from backing away from the pinion gear which rotates the tray in a projector so that the tray completely indexes with each rotation of the pinion gear. The invention is also embodied in a guide shoe which is mounted on the spindle around which the pinion gear rotates and serves as a guide for the changer arm. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts whenever they occur:

FIG. 1 is a perspective view of a projector constructed in accordance with and embodying the present invention;

FIG. 4 is a sectional view taken along line 4—4 of FIG. 1; and

FIG. 5 is a top view of the guide shoe for the slide pusher bar forming part of the changer arm.

DETAILED DESCRIPTION

Figure 2:
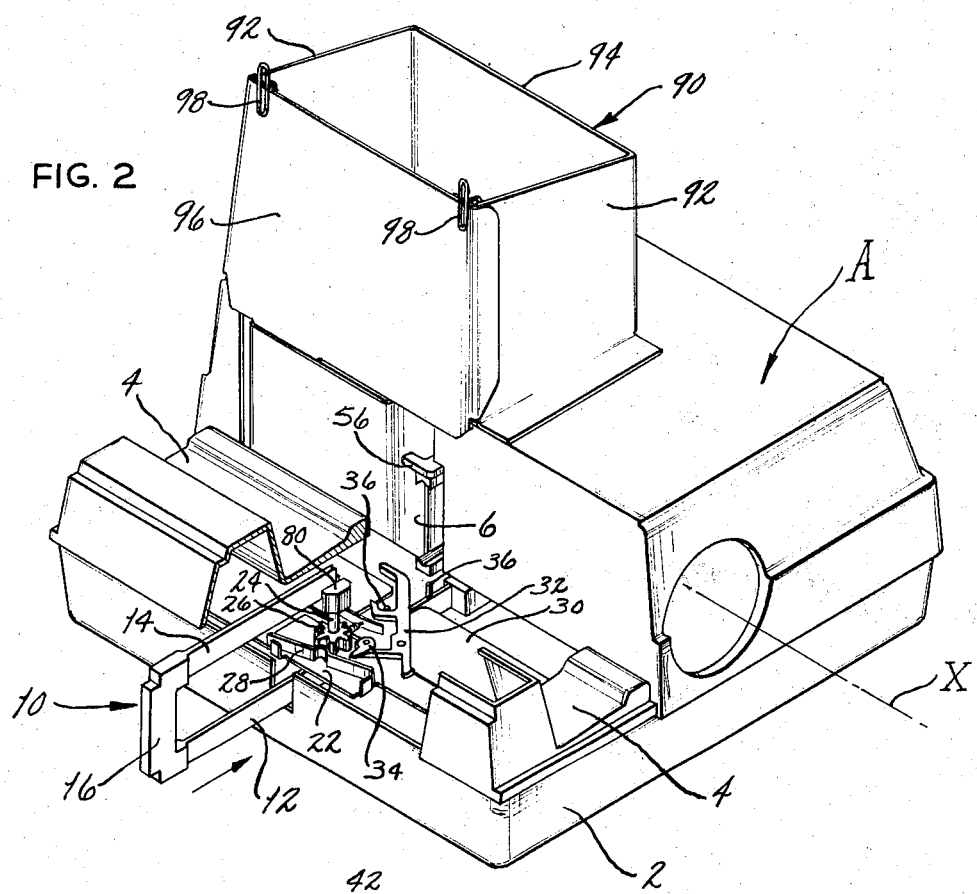
FIG. 2 is another perspective view of the projector partially broken away to illustrate the indexing mechanism thereof.

Referring now to the drawings (FIG. 1), A represents an automatic slide projector for projecting standard 2 × 2 inch slides contained in a circular slide tray T. The projector A includes a housing 2 which contains the basic projector components such as a light, a mirror behind the light, a condensor system in front of the light, and a lens beyond the condensor system. The foregoing components are located in alignment along the optical axis X (FIG. 2) of the projector. The housing 2 is further provided with a tray channel 4 which extends parallel to the optical axis X and is sized to receive standard slide trays currently available on the market for holding 2 × 2 inch slides. In addition, the housing 2 is provided with a slide channel 6 (FIG. 2) which extends across the optical axis X between the condensor and lens and opens into the tray channel 4 at its one end. The slide channel 6 is sized to accept one standard 2 ×

2 inch slide at a time and has V-shaped grooves at its upper and lower ends for guiding the upper and lower edges of the slide so as to precisely position the slides longitudinally of the optical axis X.

The tray T is positioned in the tray channel 4 by a pair of supporting or positioning rollers 8 (FIG. 4) which project from the housing 2 into the tray channel 4, thus forming a centerless mounting for the tray T. When the try T rests on the rollers 8 its axis of rotation is presented generally horizontally and directly above the slide channel 6.

Slides are ejected from the tray T in the tray channel 4 and introduced into the slide channel 6 by a changer arm 10 which moves between extended and retracted positions. Each time the changer arm 10 moves from its extended to its retracted position it crosses the tray channel 4 and drives a slide into the slide channel 6, provided of course a slide is disposed within its path. The changer arm 10 includes (FIGS. 2 and 3) an operating bar 12, a pusher bar 14 disposed above the operating bar 12, and a handle 16 interconnecting the two bars 12 and 14 at the outer end of the arm 10. The operating bar 12 passes through the housing 2 beneath the tray channel 4 therein where it is guided by a guide shoe 18 mounted firmly on the housing 2. The guide shoe 18 confines the changer arm 10 longitudinally of the tray channel 4 but does not impede mvement of the arm 10 transversely of the channel 4. At its inner end the operating bar 12 is connected to a small electric motor (not shown) through a crank mechanism so that when the motor is energized the changer arm 10 will move from its retracted position to its extended position and then back again. The motor in turn is controlled by an automatic switch so that the projector A operates automatically. The pusher bar 14 is the only portion of the changer arm 10 which extends across the tray channel 4, and this bar has a free end which is grooved to receive the side edge of a slide. When the changer arm 10 is in its extended position the free end of the pusher bar 14 is located completely beyond the tray channel 4. On the other hand, when the changer arm 10 is in its retracted position, the free end of the pusher bar 14 extends into the slide channel 16, its exact position being such that the slide engaged with it is centered with respect to the optical axis X. The handle portion 16 is accessible irrespective of the position of the changer arm 10 to enable the operator to manually operate the changer arm 10.

Aside from the foregoing, the housing 2 also contains an indexing mechanism 20 (FIG. 2) for incrementally rotating the slide tray T so as to bring different slides into alignment with the slide channel 6. This mechanism includes an outer plate 22 which extends over the operating bar 12 of the changer arm 10. The plate 22 has a spindle 24 mounted rigidly thereon and projecting upwardly therefrom adjacent to the outer side of the tray channel 4. The spindle 24 serves as a journal for a pinion gear 26, the teeth of which project laterally into the tray channel 4 for engagement with the tray T. In addition, the outer plate 22 carries a spring loaded detent 28 which engages the gear teeth located beyond the tray channel 4 so that the gear 26 moves incrementally a precise amount each time it is turned.

The indexing mechanism 20 also includes (FIG. 2) an inner plate 30 which likewise extends over the operating bar 12, yet is still disposed beneath the slide channel 4. The inner plate 30 has ratchet arm 32 pivoted thereon, and the arm 32 in turn has a pawl 34 pivoted on it adjacent to the pinion gear 26. When the changer arm 10 moves from its retracted to its extended position, the operating bar 12 thereof slides beneath the two plates 22 and 30 and pins 36 on that bar 12 engage the ratchet arm 32, causing the same to pivot. The pivoting ratchet arm 32 in turn drives the pawl 34 into engagement with the teeth of the pinion gear 26 and causes the gear 26 to rotate. The detent 28 insures that the gear 26 advances through an angle equal to the angle between adjacent teeth thereon. It should be noted that the pawl 34 rotates the gear 26 only after the free end of the pusher bar 14 clears the tray channel 4. Thus, as the changer arm 10 approaches its extended position, it actuates the indexing mechanism 20, causing the gear 26 to index one tooth.

The tray T is circular and is sized to fit within the tray channel 4 with its axis of rotation directly above the changer arm 10. It includes (FIGS. 1 and 3) an annular hub 40, an annular rim 42 and radial webs 44 interconnecting the hub 40 and rim 42. Between the webs 44 are slots 46 (FIG. 1), both ends of which are open, but the slots 46 can receive slides from only one end of the tray T. More specifically, the ends of the slots 46 at the front face of the tray T, that is the face presented toward the slide channel 6 are large enough to receive the slides, whereas the ends of the slots 46 at the back face of the tray T are large enough to receive only the pusher bar 14 of the changer arm 10. Thus, the bar 12 can pass completely through the tray T. At the back end of the tray T, where the slots 46 have their smallest opening, the rim 42 is provided with a rack 48, the teeth of which are sized to mesh with the pinion gear 26 of the indexing mechanism 20.

The tray T fits into the tray channel 4 (FIGS. 1 and 3) and is positioned in that channel 4 by the base thereof as well as by the two positioning rollers 8 (FIG. 3) projecting from the housing 2 into the channel 4. In particular, the rim 42 rides on the two rollers 8 and between them it further rests on the base of the tray channel 4. When so positioned the pinion gear 26 of the indexing mechanism 20 will mesh with the rack 48 and thereby prevent the tray T from rotating. MOreover, the detent 28 will hold the gear 26, and likewise the tray T which is engaged therewith such that the lowermost slot 46 in the tray T aligns with the slide channel 6 in the housing 2. Thus, when the pusher bar 14 of the changer arm 10 moves to its retracted position, the arm 10 will pass through the lowermost slot 46 and push the slide in that slot into the slide channel 6 where it is projected. When the pusher bar 12 moves in the opposite direction it pushes the slide out of the slide channel 6 and back into the lowermost tray slot 46. Once the pusher bar 14 clears the slide tray 4, the pin 36 moves the rachet arm 32 such that the pawl 34 thereon engages the gear 26 and rotates the gear 26 one tooth. The gear 26, being coupled to the tray T through the rack 48, in turn rotates the tray T through an angle equal to the angle between two adjacent teeth in the rack 48. This angle is the same as the angular spacing between adjacent slots 46, and hence the next slot 46 is aligned with the slide channel 6 in the housing 2.

The foregoing construction and operation are common to projectors currently available on the market, and to particularly those projector-tray combinations manufactured by Sawyer's Inc., Portland, Oregon. The primary disadvantage with the projector tray combination heretofore described resides in the centerless mounting of the tray T and also in the mounting of the changer arm 10.

With respect to the mounting of the tray T, the portion thereof above the guide rollers 8 is completely unrestrained and can therefore swing outwardly away from the optical axis X. This causes the tray T to pivot about the guide rollers 8, in which case the lowermost portion of the rack 48 tends to back away from the gear 26, and while the rack 48 may not completely disengage the gear 26, the two nevertheless become separated enough to prevent the tray T from completely indexing. In other words, the tray T turns only partially through the angle it is supposed to turn. Hence, when the pusher bar 14 again moves toward the tray T, it stands a good chance of engaging the lowermost web 44 instead of entering the slot 46 adjacent to that web. Should the pusher bar 14 engage the web 44, the changer arm 10 will jam, thus interrupting the slide presentation and perhaps damaging the motor which operates the changer arm 10.

As to the mounting of the changer arm 10, in conventional projectors it is confined at its outer end only along its operating bar 12, the confinement being effected by the guide shoes 18 located beneath tray channel 4. The pusher bar 14, which actually engages the slides is left free, and the free motion in the bar 14 has an adverse affect on the alignment between the bar 14 and the tray slot 46 it is to enter. Sometimes the free motion of the bar 14 and incomplete indexing of the tray T compound one another, in which case the changer arm 10 will almost surely jam.

The foregoing disadvantages are overcome and the projector A is made virtually jam proof by making the alterations and providing the accessories hereinafter described.

To stabilize the tray T and thereby prevent the rack 48 thereon from backing away from the pinion gear 26 of the indexing mechanism 20, the tray T is fitted with a center disk 52 (FIGS. 1 and 3) which is secured to the back face of its hub 40 and spans the hollow center of the hub 40. At the center of the disk 52, which is also the center of rotation for the tray T, the disk 52 is provided with a hard bearing surface 54 which may be a bolt head. The disk 52 may be plastic, and it is on the same end of the tray T as the rack 48.

Figure 3:
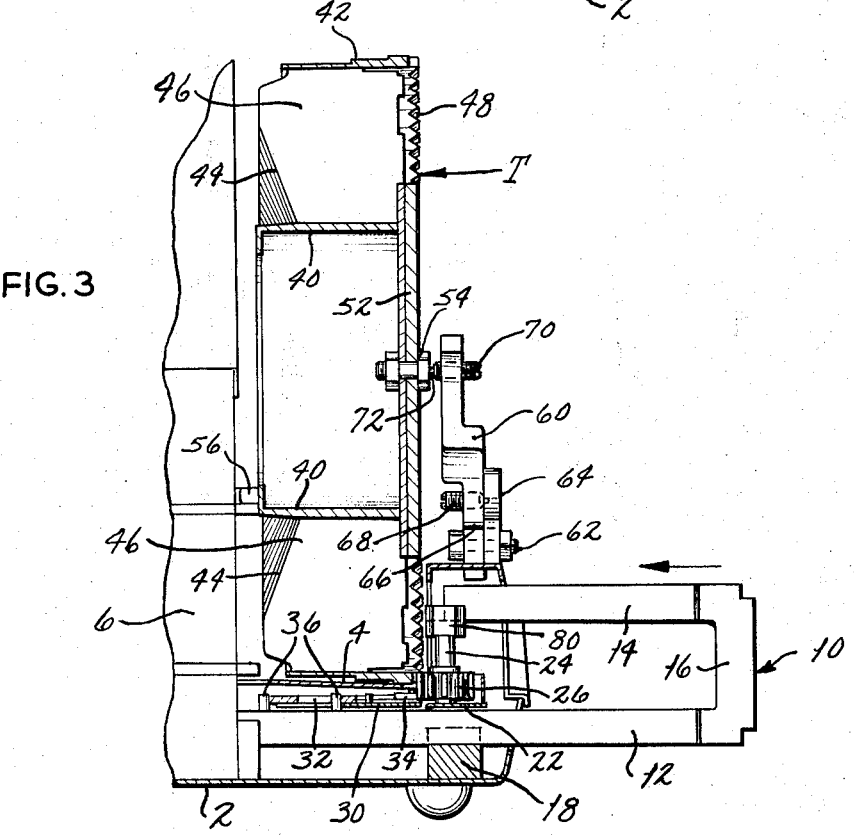
FIG. 3 is a sectional view taken along line 3—3 of FIG. 1.

The projector A, on the other hand, is fitted with a bearing shoe 56 (FIGS. 2 and 3) which is secured to the housing 2 immediately above the slide channel 6 and faces the tray channel 4. Indeed, the shoe 56 projects into the tray channel 4 directly opposite the lowermost portion of the hub 40. The positioning is such that the guide shoe 56 bears against the front face of the hub 40 as the tray T rotates in the tray channel 4 (FIG. 3). The guide shoe 56 may be formed from brass.

On the other side of the tray channel 4, the housing 2 of the projector A is fitted with a restraining arm 60 (FIGS. 1, 3 and 4) which moves from an operative position, wherein its free end is located generally opposite the bearing surface 54 on the center disk 52 of the tray T, to an inoperative position, wherein it lies along the upper surface of the housing 2 and its free end is remote from the center of the tray T. The arm 60 is hinged about a shoulder bolt 62, the axis of which extends parallel to the axis of rotation for the tray T. Thus, the arm 60 swings in a plane parallel to the back face of the tray T as it moves between its operative and inoperative positions. The shoulder bolt 62 in turn is secured in a mounting plate 64 which is bolted against that portion of the housing 2 disposed to the outside of the tray channel 4. The mounting plate 64 has a stop pin 66 (FIGS. 3 and 4) located in the path of the arm 60, and this pin 66 positions the arm 60 such that its free end is located directly opposite the bearing surface on the center disk 52 carried by the tray T. The arm 60 on the other hand is fitted with a spring loaded detent 68 which engages an indent in the plate 64 for holding the retaining arm 60 in the foregoing position. At its outer or free end, the arm 60 is fitted with a threaded stud 70 (FIGS. 3 and 4) having spring loaded ball 72 at its inwardly presented end. The ball 72 of the stud 70 is positioned directly opposite the bearing surface 54 on the tray T when the arm 60 is in its operative position. The stud 60, being threaded, is adjustable inwardly and outwardly of the restraining arm 60 so that the spring loaded ball 72 may be positioned precisely with respct to the bearing surface 54 on the tray T.

To load the projector A, the restraining arm 60 is moved to its inoperative position, in which case it will extend forwardly from its mounting plate 64 and lie along the top surface of the housing 2. With the restraining arm 60 so positioned, the slide tray T is lowered into the tray channel 4 until its rim 42 rests on the guide rollers 8. Care should be exercised to insure that the rack 48 on the tray T properly engages the gear 26 of the indexing mechanism 20. To facilitate this engagement, the tray T may be lowered into the tray channel 4 at a slight angle so that the lowermost portion of its rack 48 is initially presented away from the gear 26. Once the rim 52 comes against the guide rollers 8, the tray T should be swung to its proper angle with respect to the housing 2, in which case the teeth of the rack 48 will move into full engagement with the teeth of the pinion gear 26 and the front face of the hub 40 will abut against the bearing shoe 56. Thereafter, the restraining arm 60 is swung to its operative position, in which case the threaded stud 70 at the free end thereof will be positioned directly opposite the bearing surface 54 at the center of the tray T.

When the tray T is indexed in the conventional manner as previously described, any tendency of the top end of the tray T to move outwardly is prevented by the restraining arm 60, and hence the lowermost portion of the rack 48 on the tray T remains firmly and positively engaged with the pinion gear 26 of the indexing mechanism 20. In this connection, it should be noted that the bearing shoe 56 serves as a fulcrum between the pinion gear 26 and the adjustable stud 70 at the upper end of the restraining arm 60.

To eliminate free motion in the pusher bar 14 of the changer arm 10, that is free motion in the direction of the optical axis, the changer arm 10 is further restrained by a guide shoe 80 (FIGS. 2-5) which is mounted on the spindle 24 about which pinion gear 26 rotates. Actually, the spindle furnished with the projector is removed and replaced with the spindle 24 which is extended and is capable of supporting the guide shoe 80. The shoe 80 has an upwardly opening groove 82 (FIGS. 4 and 5) therein through which the pusher bar 14 of the changer arm 10 passes. The clearance between the walls of the groove 82 and the side faces of the pusher bar 14 is such that the bar slides easily through the groove 82, and that all free motion in the opposite direction is virtually eliminated. To attach the shoe 80 to the spindle 26, a screw 84 (FIG. 5) is extended through the former and threaded axially into the latter. The screw 84 is accessible from the groove 82. Preferably, the guide shoe 80 is made from a low friction plastic such as Delrin plastic.

Finally, the projector A is provided with a chimney 90 (FIGS. 1 and 2) which projects upwardly from the housing 2 thereof directly over the lamp therein. The chimney 90 has a pair of end walls 92 and a sidewall 94 all of which are joined together as an integral unit and are bolted to the top of the housing 2. Positioned against the two end walls 92 is a removable side plate 96 which is held in place by swing-type clips 98 on the end walls 92. The end walls 92 and sidewall 94 are painted a dull black to prevent light reflection, while the side plate 96 is left with its natural metallic luster to reflect light and thereby prevent the adjacent slides in the tray T from being overheated.

This invention is intended to cover all changes and modifications of the example of the invention herein chosen for purposes of the disclosure which do not constitute departures from the spirit and scope of the invention.

What is claimed is:

1. In a side projector capable of holding a tray of slides and including a housing having a tray channel for receiving the tray and a slide channel opening into the tray channel at one side thereof for accepting slides from the tray, a changer arm shiftable across the tray channel toward and away from the slide channel for displacing slides from the tray and pushing them into the slide channel, a spindle located adjacent to the other side of the tray channel and directly opposite the slide channel, a pinion gear on the spindle and projecting into the tray channel for engagement with a rack on the tray, means for rotating the pinion gear when the changer arm is withdrawn for indexing the tray, and means for projecting the slide which is in the slide channel; the improvement comprising a guide shoe mounted on the spindle and engaged with the changer arm for confining the changer arm in the direction transverse to the direction in which the changer arm shifts across the tray channel.

2. The structure according to claim 1 wherein the guide shoe has an upwardly opening groove which receives the changer arm.

3. The structure according to claim 2 wherein the changer arm includes a pusher bar which moves across the tray channel and engages the slides in the tray and an operating arm which extends beneath the tray channel; and wherein means are provided for engaging and turning the pinion gear, said means being actuated by the operating bar.

4. The structure according to claim 1 wherein the tray is circular; wherein means are provided in the channel for positioning the tray so that it rotates about an axis which remains fixed in position relative to the housing; wherein a bearing surface is positioned at said one side of the tray channel and generally above the entry of the slide channel into the tray channel for engagement with the end of the tray so as to position the tray relative to the pinion gear; and wherein restraining means are provided for engagement with the tray generally above the pinion gear to prevent the tray from tilting such that its rack backs away from and does not fully engage the pinion gear.

5. For use with a slide projector for projecting slides carried in a circular tray which rotates about its axial centerline and has an annular hub, an outwardly presented annular rim surrounding the hub, webs extended between the hub and rim for dividing the annular space therebetween into slide-receiving slots, and a rack on the rim at one end of the tray, said projector including a housing configured to receive the tray with the axis of rotation for the tray being presented generally horizontally, supporting means on the housing for engaging the downwardly presented surface of the rim and supporting substantially the entire weight of the tray, a pinion gear engageable with the tray rack at said one end of the tray along generally the lowermost portion of the tray for rotating the tray to bring different slides in the slots thereof into a position wherein they may be removed from the tray and projected, a positioning surface on the housing for engaging the hub at the other end of the tray and preventing the rack from moving axially away from the pinion gear, the positioning surface being located above the pinion gear, changer means for removing the slides individually from the slots in the tray, and means for projecting the slides which are removed; the improvement comprising: an end member attached rigidly to hub and extended across the hollow hub at said one end of the tray to position a bearing surface along the axis of rotation for the tray; a restraining member mounted on the housing and positioned adjacent to said one end of the tray, the restraining member being engageable with said bearing surface on the end member for applying only an axially directed force to the tray so that the tray is not supported at the restraining member and is confined in only one axial direction by the restraining member, the tray being confined in the other axial direction by the positioning surface, whereby the tray will not tilt and cause the lower portion of the rack thereon to back away from the pinion gear.

6. The structure according to claim 5 wherein the restraining member is an arm which swings from an operative position, wherein it extends generally across said one end of the tray and prevents the tray from backing away from the pinion gear, to an inoperative position, wherein it is located generally away from the tray and does not obstruct removal of the tray from the projector.

7. The structure according to claim 6 wherein the arm has an engagement member through which it engages the end member on the tray, the engagement member being disposed along the axis of rotation for the tray when the arm is in its operative position and being adjustable in the direction of the axis of rotation for the tray.

8. The structure according claim 6 wherein the arm when in its inoperative position is located in a generally horizontal disposition adjacent to the top surface of the housing, whereby it will not interfere with the insertion of a tray into or the removal of a tray from the projector.

9. The structure according to claim 5 wherein the supporting means comprises a pair of support elements, and the pinion gear is interposed between and located lower than the two support elements.

10. The structure according to claim 5 wherein the restraining member is shiftable to an inoperative position where it is located generally away from the end face of the tray to facilitate removal of the tray from the projector.

* * * * *